United States Patent
Robinson et al.

(10) Patent No.: US 10,482,522 B2
(45) Date of Patent: Nov. 19, 2019

(54) METHOD FOR PROVIDING A CUSTOMIZED PRODUCT RECOMMENDATION

(71) Applicant: The Gillette Company LLC, Boston, MA (US)

(72) Inventors: Susan Clare Robinson, Windsor (GB); Paul Leslie Warrick, Reading (GB)

(73) Assignee: The Gillette Company LLC, Boston, MA (US)

(*) Notice: Subject to any disclaimer, the term of this patent is extended or adjusted under 35 U.S.C. 154(b) by 303 days.

(21) Appl. No.: 15/635,489

(22) Filed: Jun. 28, 2017

(65) Prior Publication Data

US 2018/0040050 A1 Feb. 8, 2018

Related U.S. Application Data

(60) Provisional application No. 62/371,981, filed on Aug. 8, 2016.

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0631* (2013.01); *G06Q 30/02* (2013.01); *G06Q 30/0201* (2013.01); *G06Q 30/0203* (2013.01); *G06Q 30/0643* (2013.01)

(58) Field of Classification Search
CPC ................................................ G06Q 30/06–08
USPC ................................................ 705/26.1–27.2
See application file for complete search history.

(56) References Cited

U.S. PATENT DOCUMENTS

| | | |
|---|---|---|
| 6,189,215 B1 | 2/2001 | Beerwerth et al. |
| 8,615,886 B1 | 12/2013 | Childers |
| 8,650,953 B2 | 2/2014 | Cherian et al. |
| 9,126,346 B2 | 9/2015 | Meier et al. |
| 9,174,351 B2 | 11/2015 | Binder |
| 2006/0265244 A1 | 11/2006 | Baumann |
| 2008/0168657 A1 | 7/2008 | Cloke et al. |
| 2013/0057866 A1* | 3/2013 | Hillebrand ........... A45D 44/005 356/421 |
| 2014/0137883 A1 | 5/2014 | Rothschild |
| 2015/0183118 A1 | 7/2015 | Roth |
| 2015/0205279 A1 | 7/2015 | Simeth |
| 2016/0167241 A1 | 6/2016 | Goldfarb et al. |
| 2017/0232624 A1* | 8/2017 | King ................... B26B 21/4056 30/34.05 |

OTHER PUBLICATIONS

U.S. Appl. No. 15/635,503, filed Jun. 28, 2017, Susan Clare Robinson Paul Leslie Warrick.

(Continued)

*Primary Examiner* — Ethan D Civan
(74) *Attorney, Agent, or Firm* — Kevin C. Johnson (57) ABSTRACT

Included is a method for providing a customized product recommendation to a user. Information is collected from a user regarding a type of shaving stroke the user takes when shaving. The information collected from the user is analyzed. A product for the user is selected from at least two available products based upon the information collected from the user. The selected product is recommended to the user.

12 Claims, 6 Drawing Sheets

(56) References Cited

OTHER PUBLICATIONS

U.S. Appl. No. 15/635,536, filed Jun. 28, 2017, Susan Clare Robinson Paul Leslie Warrick.
U.S. Appl. No. 15/635,562, filed Jun. 28, 2017, Susan Clare Robinson Paul Leslie Warrick.
U.S. Appl. No. 15/635,588, filed Jun. 28, 2017, Susan Clare Robinson Paul Leslie Warrick.
U.S. Appl. No. 15/635,618, filed Jun. 28, 2017, Susan Clare Robinson Paul Leslie Warrick.
PCT International Search Report with Written Opinion in corresponding international application PCT/US2017/044617 dated Dec. 5, 2017.

* cited by examiner

METHOD FOR PROVIDING A CUSTOMIZED PRODUCT RECOMMENDATION

FIELD OF THE INVENTION

The present invention relates generally to systems and methods for providing customized product recommendations and specifically to systems and methods for providing customized hair cutting product recommendations from information collected from a user.

BACKGROUND OF THE INVENTION

A wide variety of products are marketed for cutting and removing hair. Such products include products for cutting hair, products for removing hair, products to be applied by a user prior to cutting/removing hair and products to be applied by a user after cutting/removing hair. With such a wide variety of products to choose from and each for different purposes and/or benefits it is not uncommon for a user to have difficulty determining which product or combination of products such as a regimen should be used for their unique needs.

A variety of methods have been used in other industries such as the cosmetics industry to provide customized product recommendations to users. For example, some methods use a feature-based analysis in which one or more features of a skin condition (e.g., fine lines, wrinkles, spots, uneven skin tone) are detected in a captured image (e.g., a digital photo) by looking for features that meet a definition are commonly used. However, such systems have not addressed the needs for hair cutting/removal.

Accordingly, there remains a need to provide a customized product recommendation to a user that is customized to the individual user's hair cutting or hair removal needs.

SUMMARY OF THE INVENTION

A method for providing a customized product recommendation to a user is provided. Information is collected from a user regarding a type of shaving stroke the user takes when shaving. The collected information is analyzed. A product is selected for the user from at least two available products based upon information collected and analyzed from the user. The selected product is recommended to the user.

The type of shaving stroke comprises upstrokes or mainly upstrokes, downstrokes or mainly downstrokes, a mix of upstrokes and downstrokes and cross strokes or mainly crossstrokes. The type of shaving stroke may also comprise short strokes or mainly short strokes, long strokes or mainly long strokes, a mix of short strokes and long strokes and neither short strokes nor long strokes. The type of shaving stroke may also comprise shaving with the grain, shaving against the grain, and shaving both with the grain and against the grain. Additional information is collected from a user regarding an area of the body where the shaving stroke is taken. The area of the body comprises a user's cheek, a user's neck, a user's head, a user's groin, a user's underarm, a user's chest, a user's back, a user's leg, a user's arm, and a user's bikini area.

The products comprise products to use for cutting hair, products to be applied by a user prior to cutting hair and products to be applied by a user after cutting hair.

Products for cutting hair comprise a multi-blade razor, a single blade razor, a straight razor, a disposable razor, a dry shaver, and a trimmer.

Products to be applied by the user prior to cutting hair comprise a shave cream, a shave soap, a shave oil, a shave prep, a shave foam and a shave gel.

Products to be applied by the user after cutting hair comprise an after-shave lotion, an after-shave balm, an after-shave gel, an oil, a serum and a moisturizer.

The information may be collected using a computing device. The computing device may comprise a mobile device, a tablet, a handheld device, and a desktop device.

The information may comprise voice information, pictorial information, video information, written questionnaire, and digital information.

The product selected may comprise a regimen of two or more products.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate various embodiments described herein, and together with the description serve to explain the principles and operations of the claimed subject matter.

DETAILED DESCRIPTION OF THE INVENTION

Figure 1:
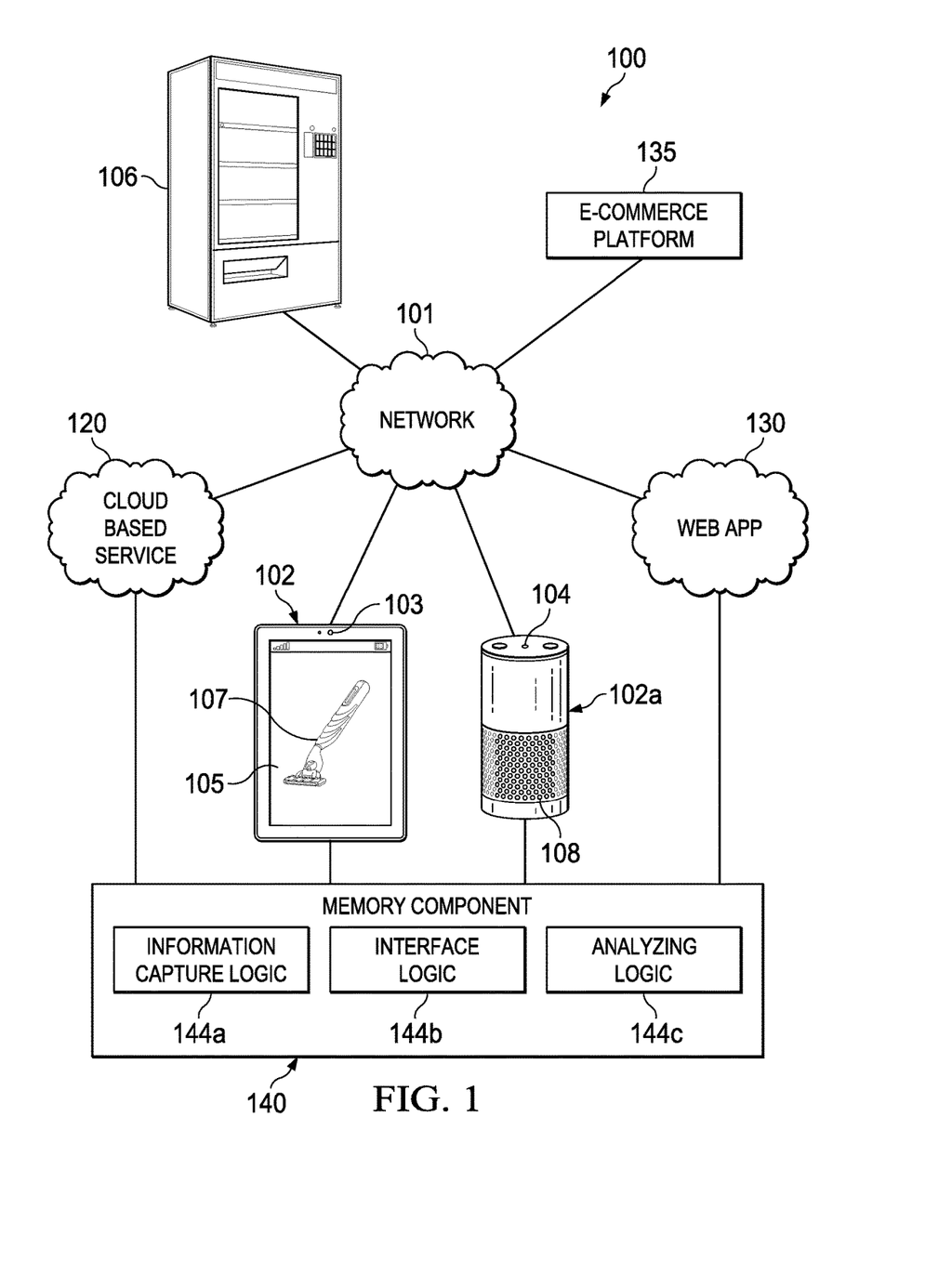
FIG. 1 depicts a computing environment for providing customized product recommendations, according to embodiments described herein.

FIG. 1 depicts a system 100 for collecting information from a user, analyzing the information, and providing a customized product recommendation. The system 100 may include a network 101, which may be embodied as a wide area network (such as a mobile telephone network, a public switched telephone network, a satellite network, the internet, etc.), a local area network (such as wireless-fidelity, Wi-Max, ZigBee™, Bluetooth™, etc.), and/or other forms of networking capabilities. Coupled to the network 101 are a computing device 102, 102a a kiosk computing device 106, a cloud based service 120, a web app 130 and/or an e-commerce platform 135.

The computing device 102, 102a may be a mobile device, a handheld device, a mobile telephone, a tablet, a laptop, a personal digital assistant, a desktop device, a desktop computer and/or other computing device configured for collecting, capturing, storing, and/or transferring information such as voice information, pictorial information, video information, written questionnaire and/or digital information such as a digital photograph. Accordingly, the computing device 102 may comprise an image capture device 103 such as a digital camera and may be configured to receive images from other devices. The computing device 102 may comprise an image display screen 105 to display an image of a product such as a multi-blade razor 107. The mobile computing device 102*a* may comprise a voice capture device 104 such as an audio recorder and may be configured to receive audio input from other devices. The computing device 102*a* may comprise a speaker 108 to provide audio information to a user. The computing device 102, 102*a* may include a memory component 140, which stores information capture logic 144*a*, interface logic 144*b*, and analyzing logic 144*c*. The memory component 140*a* may include random access memory (such as SRAM, DRAM, etc.), read only memory (ROM), registers, and/or other forms of computing storage hardware. The information capture logic 144*a*, the interface logic 144*b* and the analyzing logic 144*c* may include software components, hardware circuitry, firmware, and/or another computing infrastructure, as described herein. The information capture logic 144*a* may facilitate capturing, storing, preprocessing, analyzing, transferring, and/or performing other functions on collected information from a user. The interface logic 144*b* may be configured for providing one or more user interfaces to the user, which may include questions, options, and the like. The analyzing logic 144*c* may facilitate processing, analyzing, transferring, and/or performing other functions on collected information from a user for selecting a product to be recommended to a user. The mobile computing device 102, 102*a* may also be configured for communicating with other computing devices via the network 101. The devices may also be linked to an e-commerce platform 135 to enable the user to purchase the product(s) being recommended.

The system 100 may also comprise a kiosk computing device 106. The kiosk computing device 106 may operate similar to the computing device 102, 102*a* but may also be able to dispense one or more products and/or receive payment in the form of cash or electronic transactions.

It should be understood that while the kiosk computing device 106 is depicted as a vending machine type of device, this is merely an example. Some embodiments may utilize a mobile device that also provides payment and/or production dispensing. Consequently, the hardware and software depicted for the computing device 102, 102*a* may be included in the kiosk computing device 106 and/or other devices.

The system 100 may also comprise a cloud based service 120. The cloud based service 120 may include a memory component 140, which stores information capture logic 144*a*, interface logic 144*b*, and analyzing logic 144*c*. The memory component 140*a* may include random access memory (such as SRAM, DRAM, etc.), read only memory (ROM), registers, and/or other forms of computing storage hardware. The information capture logic 144*a*, the interface logic 144*b* and the analyzing logic 144*c* may include software components, hardware circuitry, firmware, and/or another computing infrastructure, as described herein. The information capture logic 144*a* may facilitate capturing, storing, preprocessing, analyzing, transferring, and/or performing other functions on collected information from a user. The interface logic 144*b* may be configured for providing one or more user interfaces to the user, which may include questions, options, and the like. The analyzing logic 144*c* may facilitate processing, analyzing, transferring, and/ or performing other functions on collected information from a user for selecting a product to be recommended to a user.

The system 100 may also comprise a web app 130. The web app 130 may include a memory component 140, which stores information capture logic 144*a*, interface logic 144*b*, and analyzing logic 144*c*. The memory component 140*a* may include random access memory (such as SRAM, DRAM, etc.), read only memory (ROM), registers, and/or other forms of computing storage hardware. The information capture logic 144*a*, the interface logic 144*b* and the analyzing logic 144*c* may include software components, hardware circuitry, firmware, and/or another computing infrastructure, as described herein. The information capture logic 144*a* may facilitate capturing, storing, preprocessing, analyzing, transferring, and/or performing other functions on collected information from a user. The interface logic 144*b* may be configured for providing one or more user interfaces to the user, which may include questions, options, and the like. The analyzing logic 144*c* may facilitate processing, analyzing, transferring, and/or performing other functions on collected information from a user for selecting a product to be recommended to a user.

Figure 2:
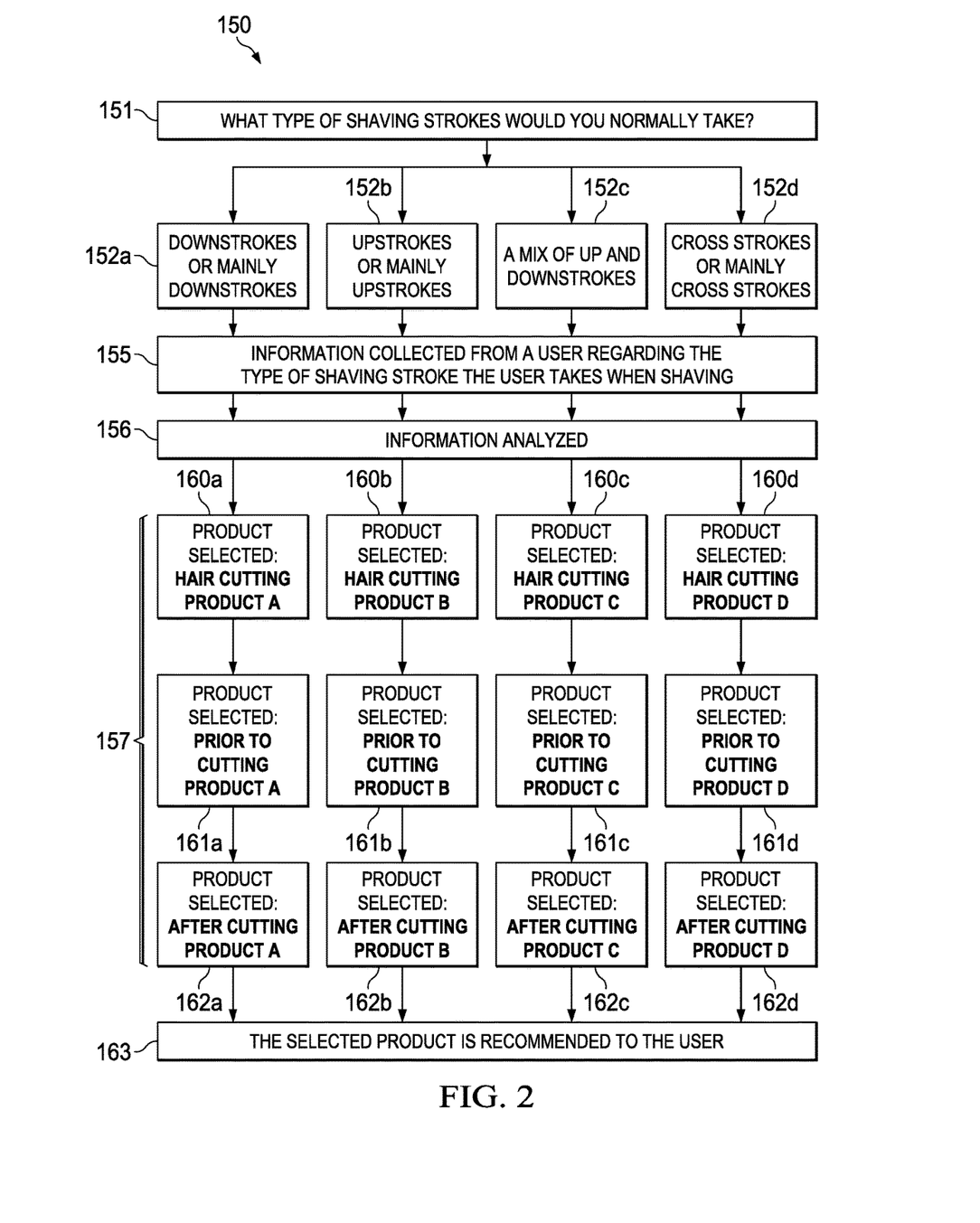
FIG. 2 depicts a flow chart of a method for providing a customized product recommendation to a user.

Referring now to FIG. 2 a flow chart 150 is shown. Flow chart 150 includes a method for providing a customized product recommendation to a user. At 151 a question is presented to the user regarding the type of shaving stoke the user takes when shaving. Shaving refers to the act of cutting hair. Several inputs/choices for the types of shaving strokes are provided at 152*a*-152*d*. The inputs/choices comprise downstrokes or mainly downstrokes 152*a*, upstrokes or mainly upstrokes 152*b*, a mix of upstrokes and downstrokes 152*c* and crossstrokes or mainly crossstrokes 152*d*. An upstroke refers to a shaving stroke where the razor travels in a generally upward direction away from a first location to a second location located generally above the first location. Downstroke refers to a shaving stroke where the razor travels in a generally downward direction away from a first location to a second location located generally below the first location. Crossstroke refers to a shaving stroke where the razor travels in a generally sideways direction away from a first location to a second location spaced from the first location and generally located neither above nor below the first location. The information from a user regarding the type of shaving stroke the user takes when shaving is collected at 155. The collected information 155 is then analyzed at 156. Based on the collected and analyzed information 155, 156, a product is selected at 157 for the user. The product selection 157 is performed from at least two available products.

Product selection 157 of a product may comprise one or more selections of different types of products. Product selection may comprise selection of a product to use for cutting hair 160*a*-160*d*. If a user selects downstrokes or mainly downstrokes 152*a* as the type of shaving stroke used, hair cutting product A is selected 160*a*. If a user selects upstrokes or mainly upstrokes 152*b* as the type of shaving stroke used, hair cutting product B is selected 160*b*. If a user selects a mix of upstrokes and downstrokes 152*c* as the type of shaving stroke used, hair cutting product C is selected 160*c*. If a user selects crossstrokes or mainly crossstrokes 152*d* as the type of shaving stroke used, hair cutting product D is selected 160*d*.

Product selection may comprise selection of a product to be applied by a user prior to hair cutting 161*a*-161*d*. If a user selects downstrokes or mainly downstrokes 152*a* as the type of shaving stroke used, prior to hair cutting product A is selected 161*a*. If a user selects upstrokes or mainly upstrokes 152*b* as the type of shaving stroke used, prior to hair cutting product B is selected 161*b*. If a user selects a mix of upstrokes and downstrokes 152*c* as the type of shaving stroke used, prior to hair cutting product C is selected 161*c*. If a user selects crossstrokes or mainly crossstrokes 152*d* as the type of shaving stroke used, prior to hair cutting product D is selected 161*d*.

Product selection may comprise selection of a product to be applied by a user after hair cutting 162*a*-162*d*. If a user selects downstrokes or mainly downstrokes 152*a* as the type of shaving stroke used, after hair cutting product A is selected 162*a*. If a user selects upstrokes or mainly upstrokes 152*b* as the type of shaving stroke used, after hair cutting product B is selected 162*b*. If a user selects a mix of upstrokes and downstrokes 152*c* as the type of shaving stroke used, after hair cutting product C is selected 162*c*. If a user selects crossstrokes or mainly crossstrokes 152*d* as the type of shaving stroke used, after hair cutting product D is selected 162*d*.

The product selection may comprise a regimen of two or more products. For example, the product selection may be a regimen comprising a product to use for cutting hair 160*a* and a product to be applied by a user prior to cutting hair 161*a*. The product selection may be a regimen comprising a product to use for cutting hair 160*b*, a product to be applied by a user prior to cutting hair 161*b* and a product to be applied by a user after cutting hair 162*b*. Other combinations are possible from the choices shown.

After the product has been selected, the selected product is recommended to the user at 163.

Figure 3:
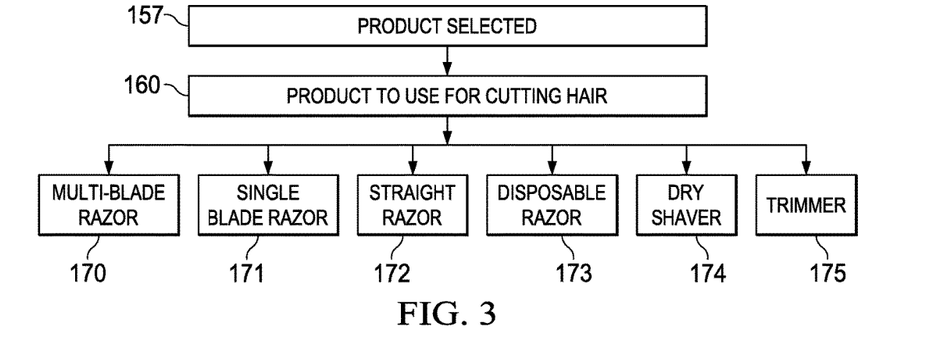
FIG. 3 depicts a chart showing products to be selected from for cutting hair.

Referring now to FIG. 3, there is shown product selection 157 of a product to use for cutting hair 160. Products to be selected from for cutting hair comprise a multi-blade razor 170, a single blade razor 171, a straight razor 172, a disposable razor 173, dry shaver 174, and a trimmer 175.

Figure 4:
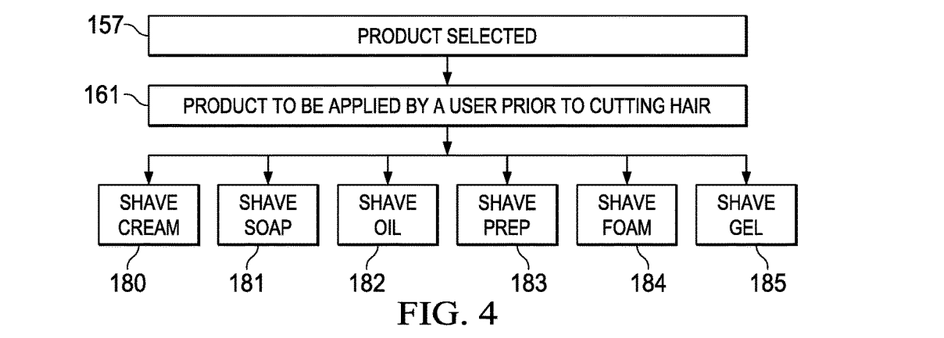
FIG. 4 depicts a chart showing products to be selected from to be applied by a user prior to cutting hair.

Referring now to FIG. 4, there is shown another product selection 157 of a product to be applied by a user prior to hair cutting 161. Products to be selected from to be applied by a user prior to hair cutting comprise a shave cream 180, a shave soap 181, a shave oil 182, a shave prep 183, a shave foam 184 and a shave gel 185.

Figure 5:
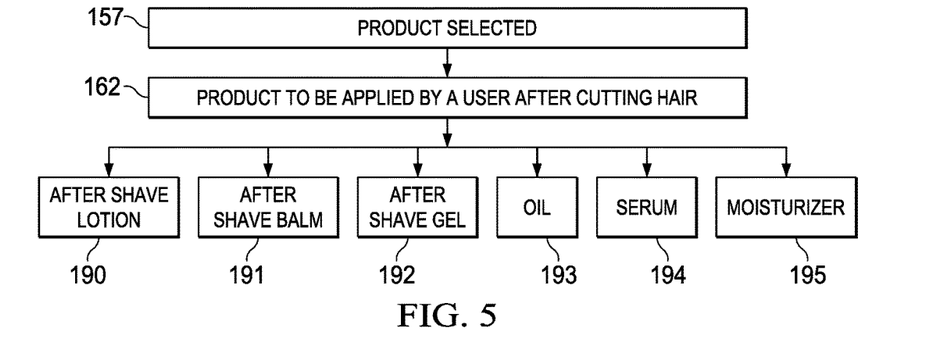
FIG. 5 depicts a chart showing products to be selected from to be applied by a user after cutting hair.

Referring now to FIG. 5, there is shown another product selection 157 of a product to be applied by a user after hair cutting 162. Products to be selected from to be applied by a user after hair cutting comprise an after-shave lotion 190, an after-shave balm 191, an after-shave gel 192, an oil 193, a serum 194 and a moisturizer 195.

Figure 6:
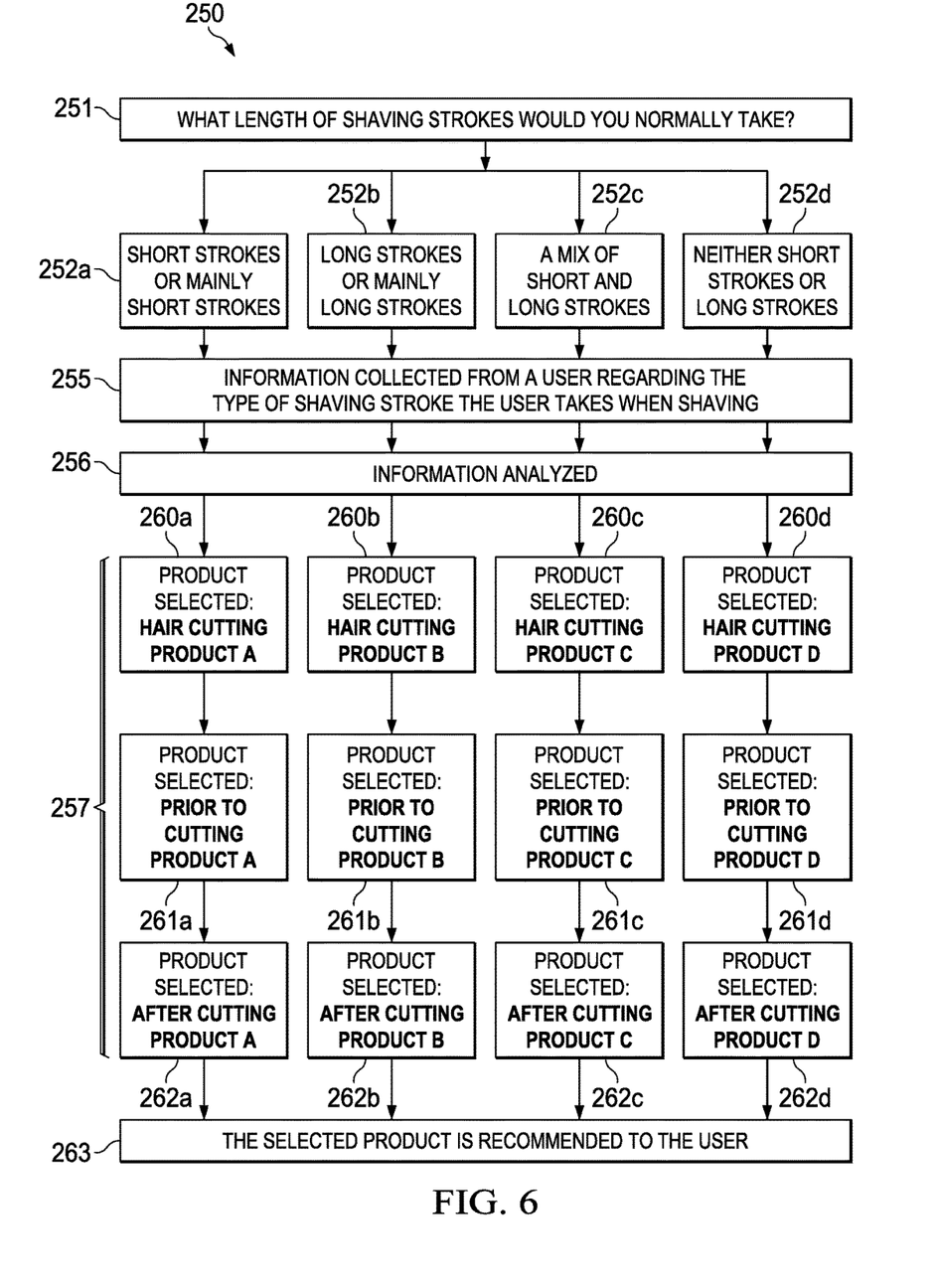
FIG. 6 depicts a flow chart of another method for providing a customized product recommendation to a user.

Referring now to FIG. 6 a flow chart 250 is shown. Flow chart 250 includes a method for providing a customized product recommendation to a user. At 251 a question is presented to the user regarding the type of shaving stoke the user takes when shaving. Question 251 may be asked on its own or in addition to question 151 from FIG. 2. The type of shaving stroke may be the length of shaving stroke taken during shaving. Several inputs/choices for the types of shaving strokes are provided at 252*a*-252*d*. The inputs/choices comprise short strokes or mainly short strokes 252*a*, long strokes or mainly long strokes 252*b*. A mix of long strokes and short strokes 252*c* and neither long strokes nor short strokes 252*d*. The information from a user regarding the type of shaving stroke the user takes when shaving is collected at 255. The collected information 255 is then analyzed at 256. Based on the collected and analyzed information 255, 256 a product is selected at 257 for the user. The product selection 257 is performed from at least two available products.

Product selection 257 of a product may comprise one or more selections of different types of products. Product selection may comprise selection of a product to use for cutting hair 260*a*-260*d*. If a user selects short strokes or mainly short strokes 252*a* as the type of shaving stroke used, hair cutting product A is selected 260*a*. If a user selects long strokes or mainly long strokes 252*b* as the type of shaving stroke used, hair cutting product B is selected 260*b*. If a user selects a mix of short strokes and long strokes 252*c* as the type of shaving stroke used, hair cutting product C is selected 260*c*. If a user selects neither short strokes nor long strokes 252*d* as the type of shaving stroke used, hair cutting product D is selected 260*d*.

Product selection may comprise selection of a product to be applied by a user prior to hair cutting 261*a*-261*d*. If a user selects short strokes or mainly short strokes 252*a* as the type of shaving stroke used, prior to hair cutting product A is selected 261*a*. If a user selects long strokes or mainly long strokes 252*b* as the type of shaving stroke used, prior to hair cutting product B is selected 261*b*. If a user selects a mix of short strokes and long strokes 252*c* as the type of shaving stroke used, prior to hair cutting product C is selected 261*c*. If a user selects neither short strokes nor long strokes 252*d* as the type of shaving stroke used, prior to hair cutting product D is selected 261*d*.

Product selection may comprise selection of a product to be applied by a user after hair cutting 262*a*-262*d*. If a user selects short strokes or mainly short strokes 252*a* as the type of shaving stroke used, after hair cutting product A is selected 262*a*. If a user selects long strokes or mainly long strokes 252*b* as the type of shaving stroke used, after hair cutting product B is selected 262*b*. If a user selects a mix of short strokes and long strokes 252*c* as the type of shaving stroke used, after hair cutting product C is selected 262*c*. If a user selects neither short strokes nor long strokes 252*d* as the type of shaving stroke used, after hair cutting product D is selected 262*d*.

The product selection may comprise a regimen of two or more products. For example, the product selection may be a regimen comprising a product to use for cutting hair 260*a* and a product to be applied by a user prior to cutting hair 261*a*. The product selection may be a regimen comprising a product to use for cutting hair 260*b*, a product to be applied by a user prior to cutting hair 261*b* and a product to be applied by a user after cutting hair 262*b*. Other combinations are possible from the choices shown.

After the product has been selected, the selected product is recommended to the user at 263.

Figure 7:
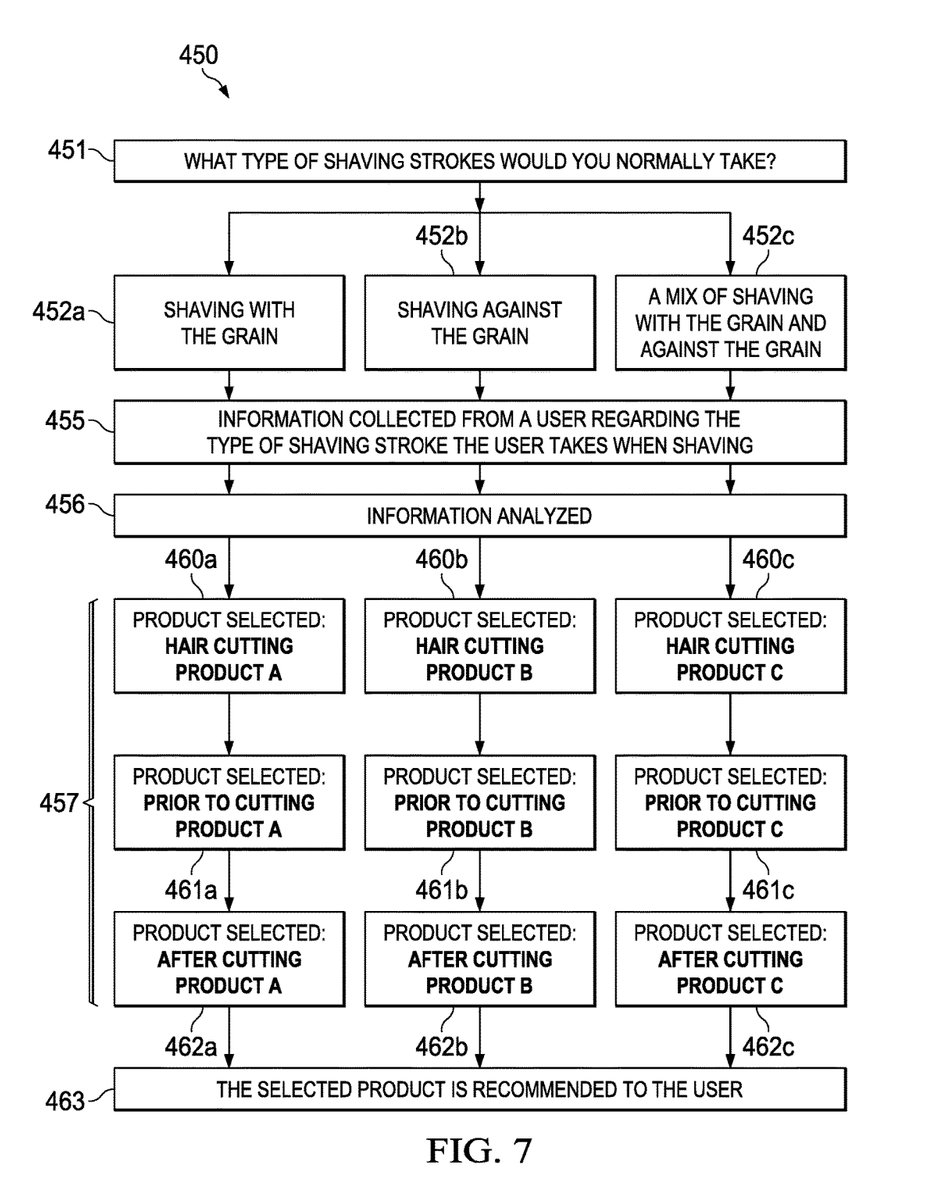
FIG. 7 depicts a flow chart of another method for providing a customized product recommendation to a user.

Referring now to FIG. 7 a flow chart 450 is shown. Flow chart 450 includes a method for providing a customized product recommendation to a user. At 451 a question is presented to the user regarding the type of shaving stoke the user takes when shaving. Question 451 may be asked on its own or in addition to questions 151 and 251 from FIGS. 2 and 6. Several inputs/choices for the types of shaving strokes are provided at 452*a*-452*c*. The inputs/choices comprise shaving with the grain 452*a*, shaving against the grain 452*b*, and a mix of shaving with the grain, and shaving against the grain 452*c*. The information from a user regarding the type of shaving stroke the user takes when shaving is collected at 455. The collected information 455 is then analyzed at 456. Based on the collected and analyzed information 455, 456 a product is selected at 457 for the user. The product selection 457 is performed from at least two available products.

Product selection 457 of a product may comprise one or more selections of different types of products. Product selection may comprise selection of a product to use for cutting hair 460a-460c. If a user selects shaving with the grain 452a as the type of shaving stroke used, hair cutting product A is selected 460a. If a user selects shaving against the grain 452b as the type of shaving stroke used, hair cutting product B is selected 460b. If a user selects a mix of shaving with the grain and against the grain 452c as the type of shaving stroke used, hair cutting product C is selected 460c.

Product selection may comprise the selection of a product to be applied by a user prior to hair cutting 461a-461c. If a user selects shaving with the grain 452a as the type of shaving stroke used, prior to hair cutting product A is selected 461a. If a user selects shaving against the grain 452b as the type of shaving stroke used, prior to hair cutting product B is selected 461b. If a user selects a mix of shaving with the grain and against the grain 452c as the type of shaving stroke used, prior to hair cutting product C is selected 461c.

Product selection may comprise selection of a product to be applied by a user after hair cutting 462a-462c. If a user selects shaving with the grain 452a as the type of shaving stroke used, after hair cutting product A is selected 462a. If a user selects shaving against the grain 452b as the type of shaving stroke used, after hair cutting product B is selected 462b. If a user selects a mix of shaving with the grain and against the grain 452c as the type of shaving stroke used, after hair cutting product C is selected 462c.

The product selection may comprise a regimen of two or more products. For example, the product selection may be a regimen comprising a product to use for cutting hair 460a and a product to be applied by a user prior to cutting hair 461a. The product selection may be a regimen comprising a product to use for cutting hair 460b, a product to be applied by a user prior to cutting hair 461b and a product to be applied by a user after cutting hair 462b. Other combinations are possible from the choices shown.

After the product has been selected, the selected product is recommended to the user at 463.

Figure 8:
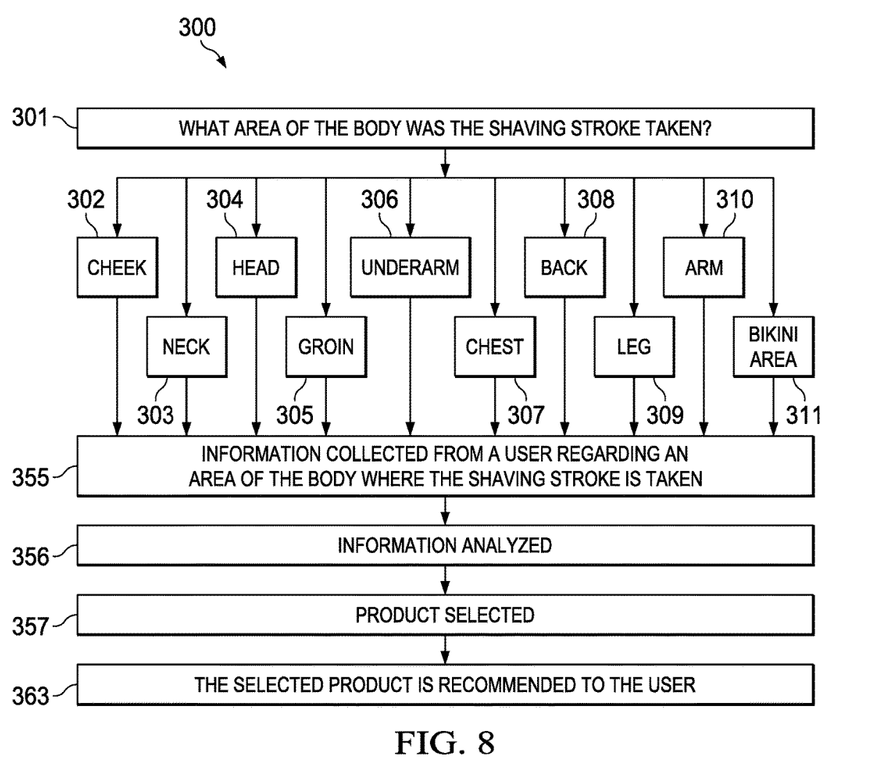
FIG. 8 depicts a flow chart of another method for providing a customized product recommendation to a user to be used in conjunction with the methods shown in FIGS. 2-7.

Referring now to FIG. 8 a flow chart 300 is shown. Flow chart 300 includes a method for providing a customized product recommendation to a user. At 301 a question is presented to the user regarding an area of the body where the shaving stroke is taken. Question 301 would come after or in addition to questions 151, 251 and 451 regarding the type of shaving stroke taken when shaving shown in FIGS. 2, 6 and 7. Several inputs/choices for the area of the body where the shaving stroke is taken are provided at 302-311. The inputs/choices include a user's cheek 302, a user's neck 303, user's head 304, a user's groin 305, a user's underarm 306, a user's chest 307, a user's back 308, a user's leg 309, a user's arm 310 and a user's bikini area 311. The information from a user regarding the area of the body where the shaving stroke is taken when shaving is collected at 355. The collected information 355 is then analyzed at 356. Based on the collected and analyzed information 355, 356, a product is selected at 357 for the user. The product selection 357 is performed on at least two available products. The steps of collecting information 355, analyzing the information 356 and selecting product are similar to those set forth above in FIGS. 2-7.

After the product has been selected, the selected product is recommended to the user at 363.

COMBINATIONS

Examples are:
A. A method for providing a customized product recommendation to a user comprising the steps of:
a. collecting information from a user regarding a type of shaving stroke the user takes when shaving;
b. analyzing the collected information;
c. selecting a product for the user from at least two available products based upon information collected and analyzed from the user; and
d. recommending the selected product to the user.
B. The method of Paragraph A, wherein the type of shaving stroke comprises upstrokes, mainly upstrokes, downstrokes, mainly downstrokes a mix of upstrokes and downstrokes, crossstrokes and mainly crossstrokes.
C. The method of Paragraphs A or B, wherein the type of shaving stroke comprises short strokes, mainly short strokes, long strokes, mainly long strokes, a mix of short strokes and long strokes and neither short strokes nor long strokes.
D. The method of Paragraphs A, B or C, wherein the type of shaving stroke comprises shaving with the grain, shaving against the grain, a mix of shaving with the grain and against the grain.
E. The method of any preceding paragraph, further comprising the step of:
e. collecting information from a user regarding an area of the body where the shaving stroke is taken.
F. The method of Paragraph E, wherein the area of the body comprises a user's cheek.
G. The method of Paragraph E, wherein the area of the body comprises a user's neck.
H. The method of Paragraph E, wherein the area of the body comprises a user's head, a user's groin, a user's underarm, a user's chest, a user's back, a user's leg, a user's arm and a user's bikini area.
I. The method of any preceding paragraph, wherein the products comprise a product for cutting hair, a product to be applied by the user prior to cutting hair and a product to be applied by the user after cutting hair.
J. The method of Paragraph I, wherein the products for cutting hair comprise a multi-blade razor, a single blade razor, a straight razor, a disposable razor, a dry shaver and a trimmer.
K. The method of Paragraph I, wherein the products to be applied by a user prior to cutting hair comprise a shave cream, a shave soap, a shave oil, a shave prep, a shave foam and a shave gel.
L. The method of Paragraph I, wherein the products to be applied by the user after cutting hair comprise an after-shave lotion, an after-shave balm, an after-shave gel, an oil, a serum and a moisturizer.
M. The method of any preceding paragraph, wherein the information is collected using a computing device.
N. The method of paragraph M, wherein the computing device comprises a mobile device, a tablet, a handheld device, and a desktop device.
O. The method of any preceding paragraph, wherein the information comprises voice information, pictorial information, video information, written questionnaire, and digital information.
P. The method of any preceding paragraph, wherein the product selected comprises a regimen of two or more products.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A digital imaging method of analyzing shaving stroke video information for providing a customized product recommendation to a user, the digital imaging method comprising the steps of:
    a. collecting by a digital camera video information from a user when shaving;
    b. transmitting the video information from the digital camera to a computing device;
    c. analyzing by an analyzing logic in the computing device the video information from the digital camera to determine a type of each shaving stroke and an area on the body where each shaving stroke is taken when shaving;
    d. selecting by the analyzing logic in the computing device a product for the user from at least two available products based upon the type of each shaving stroke and the area on the body where each shaving stroke is taken; and
    e. recommending by an interface logic in the computing device the selected product to the user.

2. The method of claim 1, wherein the type of shaving stroke comprises upstrokes, mainly upstrokes, downstrokes, mainly downstrokes, a mix of upstrokes and downstrokes, crossstrokes, mainly crossstrokes, long strokes, mainly long strokes, short strokes, mainly short strokes, a mix of short strokes and long strokes, neither short strokes nor long strokes, shaving with the grain, shaving against the grain and a mix of shaving with the grain and against the grain.

3. The method of claim 1, wherein the area of the body comprises a user's cheek.

4. The method of claim 1, wherein the area of the body comprises a user's neck.

5. The method of claim 1, wherein the area of the body comprises a user's head, a user's groin, a user's underarm, a user's chest, a user's back, a user's leg, a user's arm and a user's bikini area.

6. The method of claim 1, wherein the products comprise a product for cutting hair, a product to be applied by the user prior to cutting hair and a product to be applied by the user after cutting hair.

7. The method of claim 6, wherein the products for cutting hair comprise a multi-blade razor, a single blade razor, a straight razor, a disposable razor, a dry shaver and a trimmer.

8. The method of claim 6, wherein the products to be applied by a user prior to cutting hair comprise a shave cream, a shave soap, a shave oil, a shave prep, a shave foam and a shave gel.

9. The method of claim 6, wherein the products to be applied by the user after cutting hair comprise an after-shave lotion, an after-shave balm, an after-shave gel, an oil, a serum and a moisturizer.

10. The method of claim 1, wherein the computing device comprises a mobile device, a tablet, a handheld device, and a desktop device.

11. The method of claim 1, wherein the product selected comprises a regimen of two or more products.

12. A system for providing a customized product recommendation to a user comprising:
    a. a digital camera for collecting video information from a user when shaving;
    b. a transmitter for transmitting the digital video information to a computing device;
    c. an analyzing logic in the computing device for analyzing the video information from the digital camera to determine a type of each shaving stroke and an area of the body where each shaving stroke is taken when shaving;
    d. an analyzing logic in the computing device for selecting a product for the user from at least two available products based upon the type of each shaving stroke taken and the area on the body where each shaving stroke is taken; and
    e. an interface logic in the computing device for recommending the selected product to the user.

* * * * *